United States Patent
Drepper

(10) Patent No.: US 7,926,047 B2
(45) Date of Patent: Apr. 12, 2011

(54) METHODS AND SYSTEMS FOR OPTIMIZATION IN A RUN-TIME ENVIRONMENT

(75) Inventor: Ulrich Drepper, Mountain View, CA (US)

(73) Assignee: Red Hat, Inc., Raleigh, NC (US)

(*) Notice: Subject to any disclaimer, the term of this patent is extended or adjusted under 35 U.S.C. 154(b) by 1080 days.

(21) Appl. No.: 11/563,919

(22) Filed: Nov. 28, 2006

(65) Prior Publication Data

US 2008/0127154 A1 May 29, 2008

(51) Int. Cl.
*G06F 9/45* (2006.01)
*G06F 9/46* (2006.01)

(52) U.S. Cl. ........ 717/151; 717/127; 717/131; 717/158; 718/104; 718/105

(58) Field of Classification Search .................. 717/162, 717/163
See application file for complete search history.

(56) References Cited

U.S. PATENT DOCUMENTS

| | | | | |
|---|---|---|---|---|
| 5,659,753 A | * | 8/1997 | Murphy et al. | 717/147 |
| 6,091,897 A | * | 7/2000 | Yates et al. | 717/138 |
| 6,158,049 A | * | 12/2000 | Goodwin et al. | 717/158 |
| 6,247,174 B1 | * | 6/2001 | Santhanam et al. | 717/154 |
| 6,324,688 B1 | * | 11/2001 | Brown et al. | 717/148 |
| 6,678,886 B2 | * | 1/2004 | Kumon | 717/151 |
| 6,820,258 B1 | * | 11/2004 | Fink et al. | 717/158 |
| 7,721,274 B1 | * | 5/2010 | Panchenko et al. | 717/153 |
| 2004/0064809 A1 | * | 4/2004 | Liu et al. | 717/158 |

* cited by examiner

*Primary Examiner* — Thomas K Pham
(74) *Attorney, Agent, or Firm* — MH2 Technology Law Group LLP

(57) ABSTRACT

An embodiment relates generally to a method of optimization in a run-time execution environment. The method includes providing for a plurality of symbol tables, each symbol table associated with a respective object, the plurality of objects being linked to create a runtime version of a program. The method also includes searching through a selected symbol table of the plurality of symbol tables and determining a symbol type of an entry in the selected symbol table. The method further includes executing a callback function in response to the symbol type being an special symbol table entry and returning the address of an optimized function for the entry in the selected symbol table.

20 Claims, 7 Drawing Sheets

METHODS AND SYSTEMS FOR OPTIMIZATION IN A RUN-TIME ENVIRONMENT

FIELD

This invention relates generally to run-time environments, more particularly, to methods and systems for optimizing run-time environments.

DESCRIPTION OF THE RELATED ART

It is generally well known that a software application is assembled from multiple pieces when invoked. The underlying computing platform (personal computer, client, etc.) may provide run-time libraries, which are used by all software applications. Every non-trivial software application relies on other libraries so as not to repeat already existing functions, i.e., not to reinvent the wheel. These libraries are not actually made part of the program binary because of severe consequences. Instead, the libraries and the associated functions are used when referenced, symbolically or by direct reference. Thus, it is up to the run-time linker to assemble the complete image of the software application so it can be executed. Accordingly, the run-time linker has the responsibility of loading all the dependencies, i.e., the libraries the software application relies on, and resolve the actual function and variable references.

The function and variable resolution is designed to be efficient and speedy. The runtime linker has to find the one instance of the function or variable which is referenced merely by its name. In other implementations the static linker might make the decision, also by the name alone. However, this has led to some drawbacks and disadvantages. For example, when new processors or new versions of an operating system are introduced, software applications may want to modify their libraries to utilize the latest features of the processors/operating system. Accordingly, libraries (or respective object files) are created for each variant of the processor/operating system feature. This has a high cost since each of the variant of the object file has to be quality assured before distribution. This applies even to the code in the library which is shared between all variants. Thus, it would be desirable to have one symbol refer to a set of functions, each function optimized for a particular variant of processor/operating system feature.

A roadblock for implementing multiple definitions for a symbol in current systems is that the run-time or static linker is the mechanism that makes the decision. Unfortunately, it is impractical and unwanted to embed the knowledge to pick the best variant into the run-time or static linker. The list of such rules is likely to be open-ended and even controversial. In the case of the static linker can the decision not be made at all since the execution environment is not known. The preferable solution is to leave the selection of the best variant to the author of the library who knows exactly what s/he had in mind when creating the library.

BRIEF DESCRIPTION OF THE DRAWINGS

Various features of the embodiments can be more fully appreciated, as the same become better understood with reference to the following detailed description of an embodiment when considered in connection with the accompanying figures, in which.

DETAILED DESCRIPTION OF EMBODIMENTS

Figure 1A:
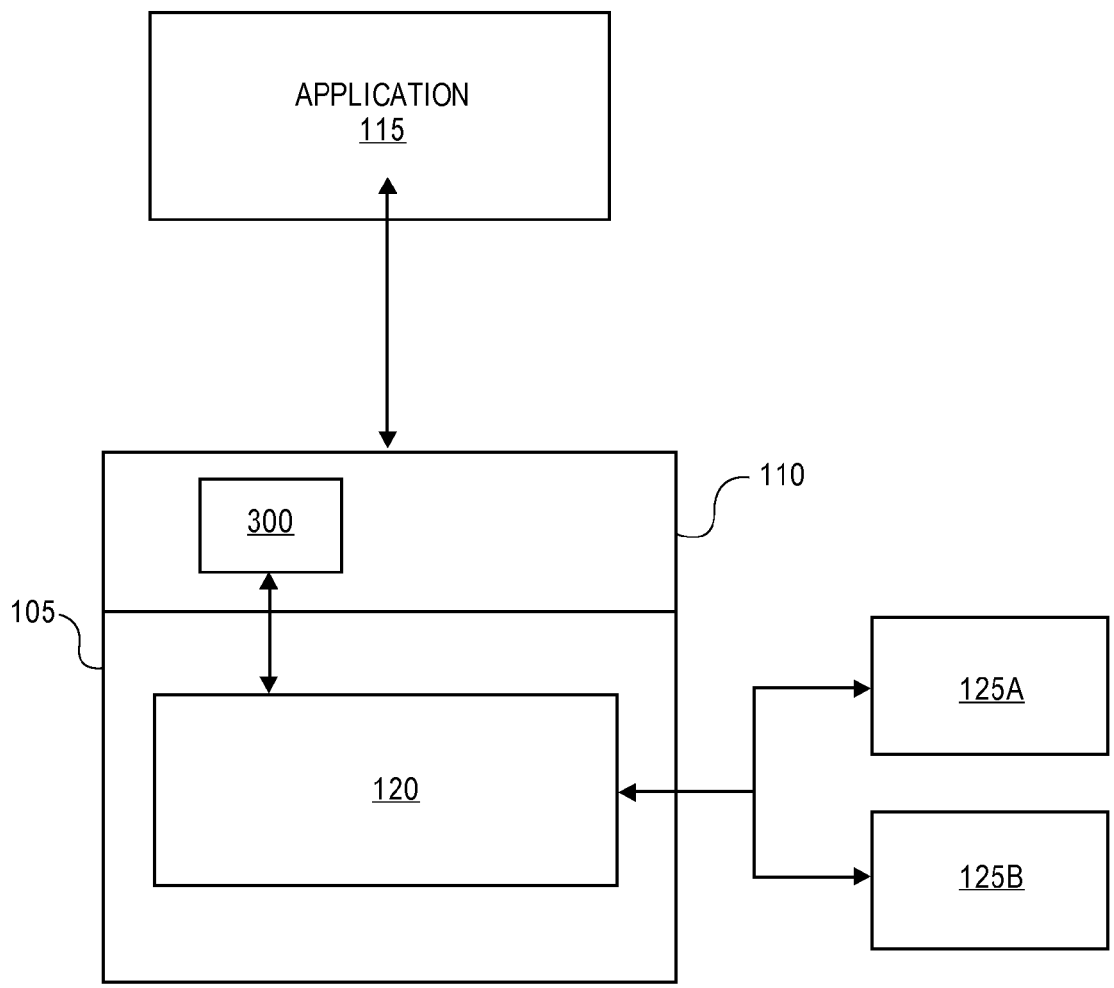
FIG. 1A illustrates a conventional software environment.

For simplicity and illustrative purposes, the principles of the present invention are described by referring mainly to exemplary embodiments thereof. However, one of ordinary skill in the art would readily recognize that the same principles are equally applicable to, and can be implemented in, all types of computing systems, and that any such variations do not depart from the true spirit and scope of the present invention. Specifically, the following description assumes the separate existence of a runtime-linker. This is not necessarily the case, the functionality can be implemented as part of the application itself. Furthermore, the description will concentrate on linking at runtime. Similar problems exist when the static linker makes the decisions. In this case it is possible to refine the decision at runtime. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods, apparatus, and systems for using optimized functions in a run-time environment. More particularly, a method to refine the results of a symbol resolution based on feedback. As the optimizing linker searches through the symbol tables of loaded objects of an invoked application to locate definitions for the symbols, the linker may encounter special matching table entry in the symbol table. Unlike a conventional linker that would return the matching definition, the optimizing run-time linker is configured to execute the callback function that is addressed by the value in the special table entry. The callback function may determine the characteristics of the actual execution environment (e.g., type of CPU, operating system version, peripherals, etc.). The callback function may then return an address of an optimized function which is used in place of the value of the original symbol in the symbol table based on the execution environment.

The use of the callback function can be advantageous in enabling new features in microprocessors or operating systems which cannot be used by default. More specifically, existing libraries and/or programs are typically written optimized for a particular version of a microprocessor as an example. The existing libraries and/or programs have to be extended or replaced with versions containing optimized versions of the function to capture the latest features of later models of the microprocessors. This oftentimes involves providing separate object files with just the replaced functions for the microprocessor variants. Doing this means additional costs at runtime since another object has to be loaded, bringing with it all the extra one-time and recurring costs associated with it. Alternatively the whole library can be replaced. There is a high cost associated with this approach, too, since each of the object files has to be quality assured individually for distribution. To prevent these costs, an author may write a callback function in accordance with various embodiments that can determine the most relevant implementation based on characteristics of the runtime environment and have the callback function be called by the runtime linker through the special symbol table entry. Thus, the existing libraries and/or programs can transparently call and use the optimal function implementation for their execution environment by using the special table entry.

FIG. 1A illustrates a conventional software environment 100 in accordance with an embodiment. It should be readily apparent to those of ordinary skill in the art that the software environment 100 depicted in FIG. 1A represents a generalized schematic illustration and that other components may be added or existing components may be removed or modified.

As shown in FIG. 1A, the software environment 100 may include an operating system 105. The operating system 105 may be a version of a Linux™, UNIX™, Windows™, or similar multitasking operating system. A run-time environment 110 may be configured to execute on the operating system 105. The run-time environment 110 may provide a set of software that supports the execution of applications/programs. The run-time environment 110 may include an application program interface ("API", not shown) and a complementary API (not shown) within an application 115. The API may be configured to provide a set of routines that the application 115 uses to request lower-level services performed by the operating system 105. The operating system 105 may include a kernel 120. The kernel 120 may be configured to provide secure access to the underlying hardware of a processor.

The kernel 120 may also be configured to provide access to run-time libraries 125A for application 115. The run-time libraries may comprise multiple object files, which contain various library of functions such as GNU C Standard Library ("glibc"), C++ Standard Library, Common Language Runtime, etc. Each of the object files in the run-time libraries may contain a symbol table (not shown).

The kernel 120 may execute a run-time linker 130 in response to an invocation of the application 115. Objects 125B may be objects that are stored on a peripheral(s), which are loaded as part of application 115. The run-time linker 130 can be configured to determine and load dependencies of the application 115 such as the run-time libraries 125A or object 125B. The run-time linker 130 may also, if needed, relocate application 115 and its dependencies. The run-time linker 130 may be further configured to initialize the application 115 and dependencies in the correct order.

Figure 1B:
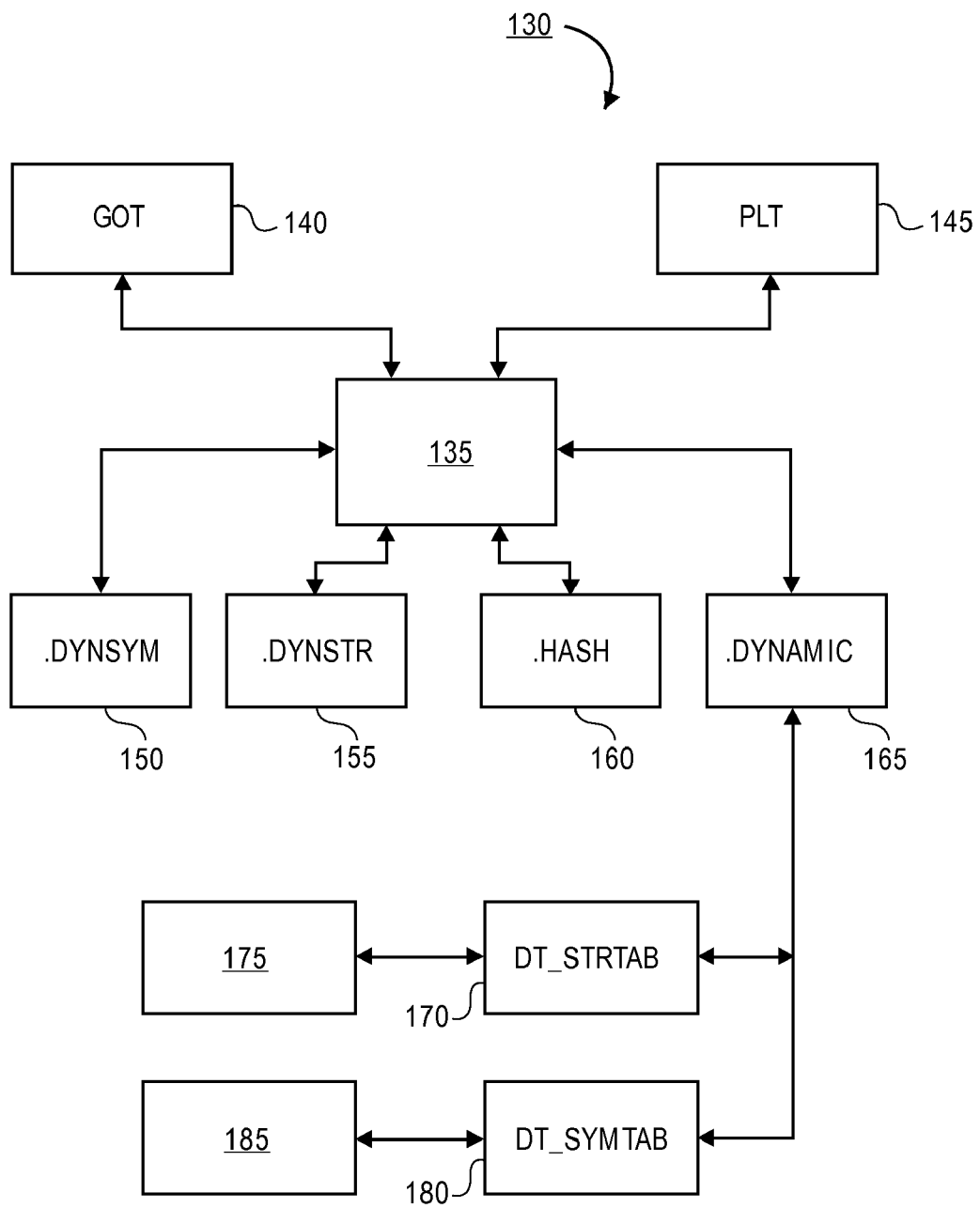
FIG. 1B illustrates the conventional data structure of an executable.

FIG. 1B illustrates a conventional set of data structures used by the run-time linker 130. It should be readily apparent to those of ordinary skill in the art that the run-time linker 130 depicted in FIG. 1 represents a generalized schematic illustration and that other components may be added or existing components may be removed or modified. Moreover, the run-time linker 130 may be implemented using software components, hardware components, or combinations thereof. The software components may be implemented using a variety of computer languages such as C, C++, JAVA, etc.

As shown in FIG. 1B, the run-time linker 130's central part comprises of the program code implementing the run-time linker 130. In some embodiments, the run-time linker 130 may support executable and linking format ("ELF") and. in other embodiments, the run-time linker 130 may support Extended Common Object File Format ("ECOFF"). Accordingly, the main module 135 may be configured to use at least two processor specific tables, the Global Offset Table (labeled as GOT) 140 and the Procedure Linkage Table (labeled as PLT) 145 for each loaded object. The main module 135 may support position independent code ("PIC") through the GOT 140 in each library 125. The GOT 140 may be configured to store the absolute addresses of all of the static data referenced in the program. The address of the GOT 140 may be determined through a machine-dependent way.

With reference to the PLT 145, the executables that use the shared libraries and the shared library each may have a PLT. Similar to how the GOT 140 redirects any position-independent address calculations to absolute locations, the PLT 140 redirects position-independent function calls to absolute locations.

The main module 135 may also be configured to interface with .DYNSYM 150, which contains all of the file's imported and exported symbols. The main module 135 may be further configured to interface with .DYNSTR 155, which contains name strings for the symbols, .HASH 160 which a runtime linker can use to lookup symbols quickly, and .DYNAMIC 165, which is a list of tagged values and pointers.

The .DYNAMIC 165 may be configured to contain the following tag types. A DT_STRTAB 170 may be configured to hold the address of a string table 175. A DT_SYMTAB 180 may be configured to store the address of the symbol table 185.

Figure 2:
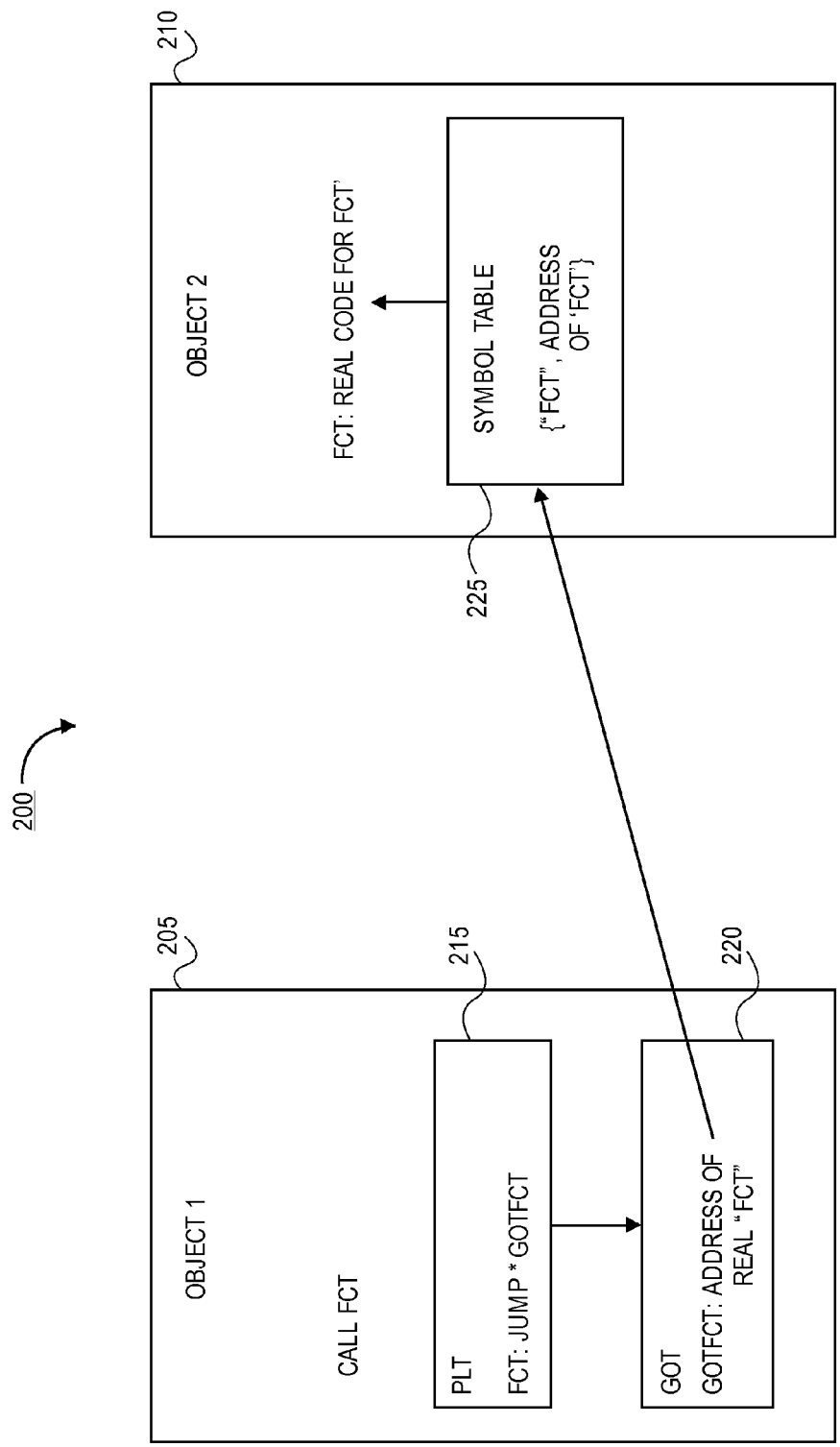
FIG. 2 illustrates a simplified overview of a conventional function resolution by a run-time linker.

FIG. 2 illustrates a diagram 200 of conventional linking of two objects for a call instruction, call fct, in a first object of a function that is implemented in the second object in conjunction with FIG. 1 B. As shown, when object 1 205 was initially created, it was not known where the actual implementation of fct resides (in object 2 210). Accordingly, an indirection is used to locate the address of fct function at runtime. More particularly, the call to fct is redirected into the PLT 145 (shown in FIG. 1B). The PLT 145 contains a little code for each referenced function, which basically is a single indirect jump instruction. For most architectures, the content of the PLT 145 cannot be changed so the address of the called function is kept in yet another data structure, the GOT 140. The indirect jump in the PLT 215 will fetch the value of this GOT entry and transfer control over to the location specified by the value, object 2 210. The address stored in the GOT entry can be the implementation of fct in object 2 210.

The final address is computed by the run-time linker at software application startup time or when the PLT entry is used for the first time. At this point, the run-time linker looks through all the loaded objects in a specified order and determines where a suitable definition of the function, fct, can be found. Each object contains a symbol table where the run-time linker searches to locate a matching definition. As shown in FIG. 2, the symbol table 225 of object 210 has a record for a function, fct, which refers to the local definition of the function. Accordingly, FIG. 2 illustrates how a conventional run-time resolves symbols and/or functions at startup time.

Figure 3:
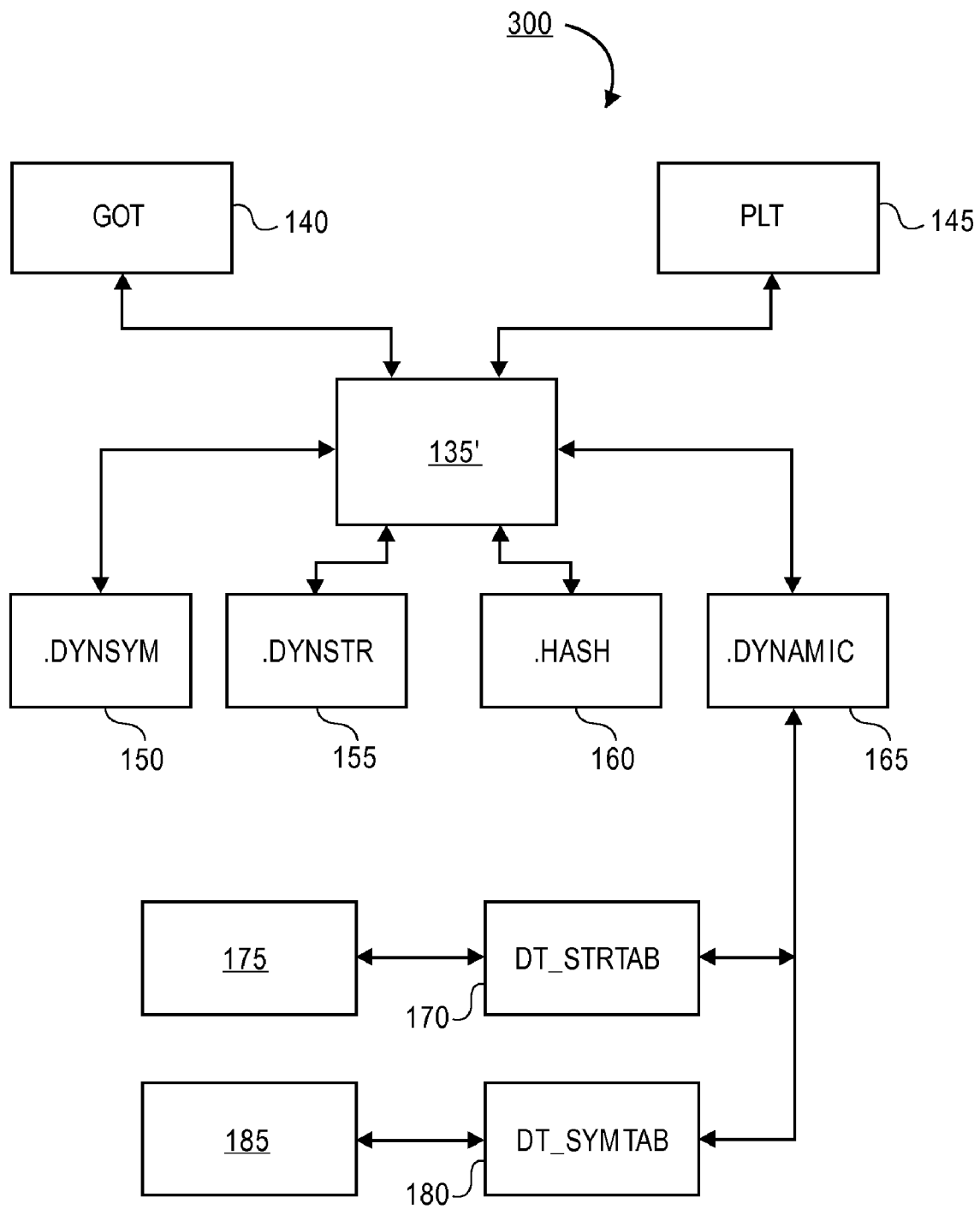
FIG. 3 illustrates an exemplary data structure for the optimizing run-time linker in accordance with an embodiment.

FIG. 3 illustrates a simplified block diagram of the optimal run-time linker 300. The optimal run-time linker 300 may be configured to have at least the same functionality as the conventional run-time linker 130. Accordingly, the description of the common features in FIG. 3 are omitted and the description features with respect to FIG. 2 are being relied upon to provide to provide adequate descriptions of the common features.

As shown, the optimizing run-time linker 300 can also be told about an optimized definition for a symbol based on at least one characteristic of the run-time environment. More specifically, the main module 135' may be configured to recognize a new, special type of entry in the symbol tables of the object files of an application and/or run-time libraries. The special symbol entry is configured to reference an address of a callback function, which the run-time linker 300 has to execute to retrieve the final address. For example, using the call instruction from an earlier example, call fct (see FIG. 2), FIG. 4 illustrates a block diagram 400 how the special symbol entry and the optimal function interact.

Figure 4:
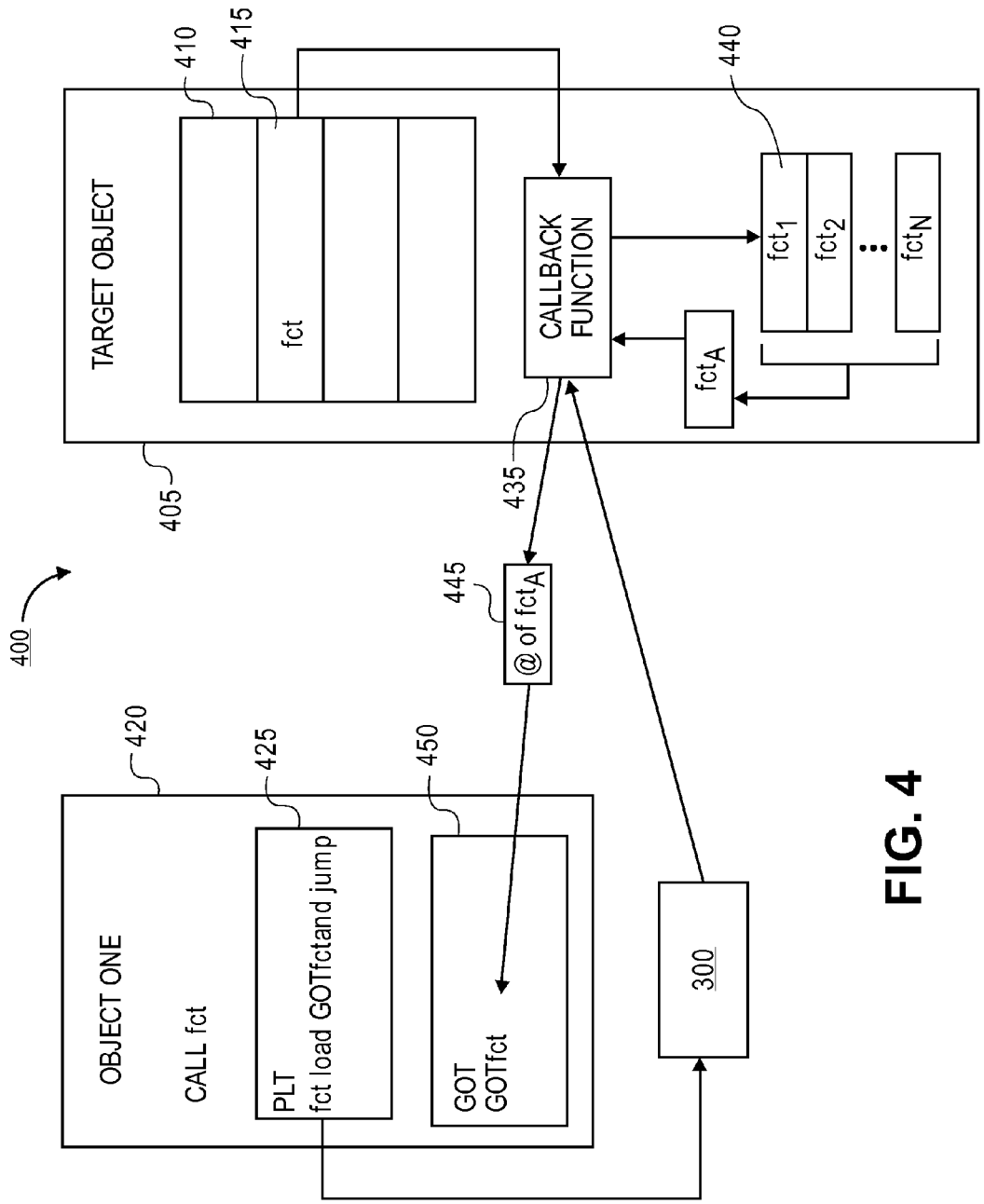
FIG. 4 illustrates function resolution by the optimizing run-time linker in accordance with another embodiment.

As shown in FIG. 4, a call instruction to a function fct may need to be resolved. The initial GOT content makes the PLT entry call to the run-time linker 300. The run-time linker 300 may be configured to scan the symbol table 410 in the target object 405. The run-time linker 300 uses the function name associated with the PLT entry to locate a matching symbol table entry in the target object 405's symbol table 410. The target object 405 comprises at least one special symbol entry 415 in the symbol table 410 among conventional symbol entries. For this example, the function, fct, is a special symbol entry. The difference between a special table entry and the conventional table entry is that the conventional symbol table entry points to the function which is gets finally used directly while the special symbol table entry points to a callback function which has to be called to determine the final address. Accordingly, the run-time linker 300 may then call the callback function 435 addressed by the special symbol table entry.

The target object 405 may be configured to store at least one variant of the function, fct, optimized for a respective configuration. In some embodiments, the target object 405 may be configured to store multiple variants $fct_1 \ldots fct_N$ 440 of the function, fct, where each variant has been optimized for a respective configuration. When called by the run-time linker 300, the callback function 435 may select an optimized fct for an Intel processor ($fct_1$), an AMD processor ($fct_2$), or an operating system version ($fct_k$). Accordingly, the callback function 435 may be implemented as a function that can initially determine the characteristics of the run-time environment such as processor type, operating system version, etc., as known to those skilled in the art. Other examples include support for different multi-media extensions support by the processors and support for newer system calls into the operating system which are missing in earlier versions. The callback function 435 may then be configured to select the appropriate variant of the function, $fct_A$, which is then identified by its address. The address of the selected function 445 may then be returned to the run-time linker 300 which stores it at in the GOT entry 450 (i.e., GOTfct). From then on all calls to fct through the PLT entry 425 will be directly referred to the selected function $fct_A$.

Figure 5:
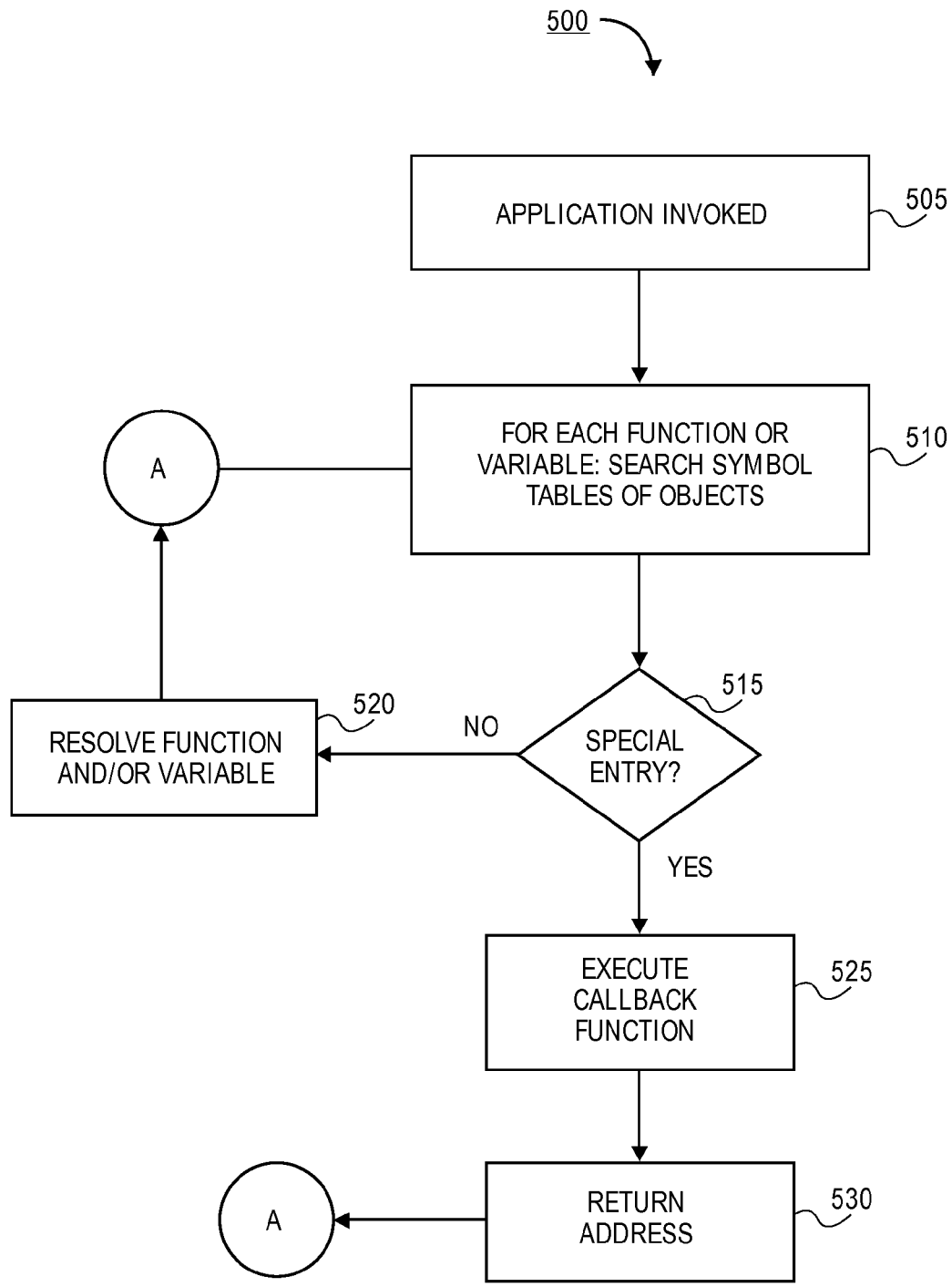
FIG. 5 illustrates an exemplary flow diagram executed by the optimizing run-time linker in accordance with yet another embodiment.

FIG. 5 illustrates a flow diagram executed by the main module 135' of the run-time linker 300 in accordance with another embodiment. It should be readily apparent to those of ordinary skill in the art that the flow diagram 500 depicted in FIG. 5 represents a generalized schematic illustration and that other steps may be added or existing steps may be removed or modified.

As shown in FIG. 5, the main module 1351 may be configured to start loading the dependencies from the object files of the run-time libraries and/or application libraries of the underlying computing platform and initiate resolution of functions and/or variable references, in step 505.

For each used function and/or variable, the main module 135' may be configured to search the symbol tables of the loaded object files for the function and/or variable referenced in the relocation record for the symbol reference, in step 510.

For a matching entry in the symbol table, the main module 135 may be configured to determine the type of entry, in step 515. If the entry is a conventional entry, the main module 135' may be configured to resolve the function and/or variable as previously discussed with respect to FIG. 2, in step 520. Subsequently, the main module 135' may proceed to the next unresolved function and/or variable, in step 510.

Returning to step 515, if the main module 135 determines that the type of entry is special symbol entry, the main module 135' may be configured to execute the callback function referenced by the value in the special symbol table entry, in step 525.

In step 525, the main module 135' may execute the callback function. The callback function may be configured to determine at least one characteristic of the run-time environment, e.g., type of processor, operating system version, etc., and select an optimized variation of the called function. The callback function then returns the address of the optimized function to the main module 135', in step 540. Subsequently, the main module 135' may proceed to the next unresolved function and/or variable, in step 510. It is also possible to delay the processing of the symbol table entries and determine the function address with a call to the callback function when the symbol table is used for the first time, as illustrated in FIG. 4.

Figure 6:
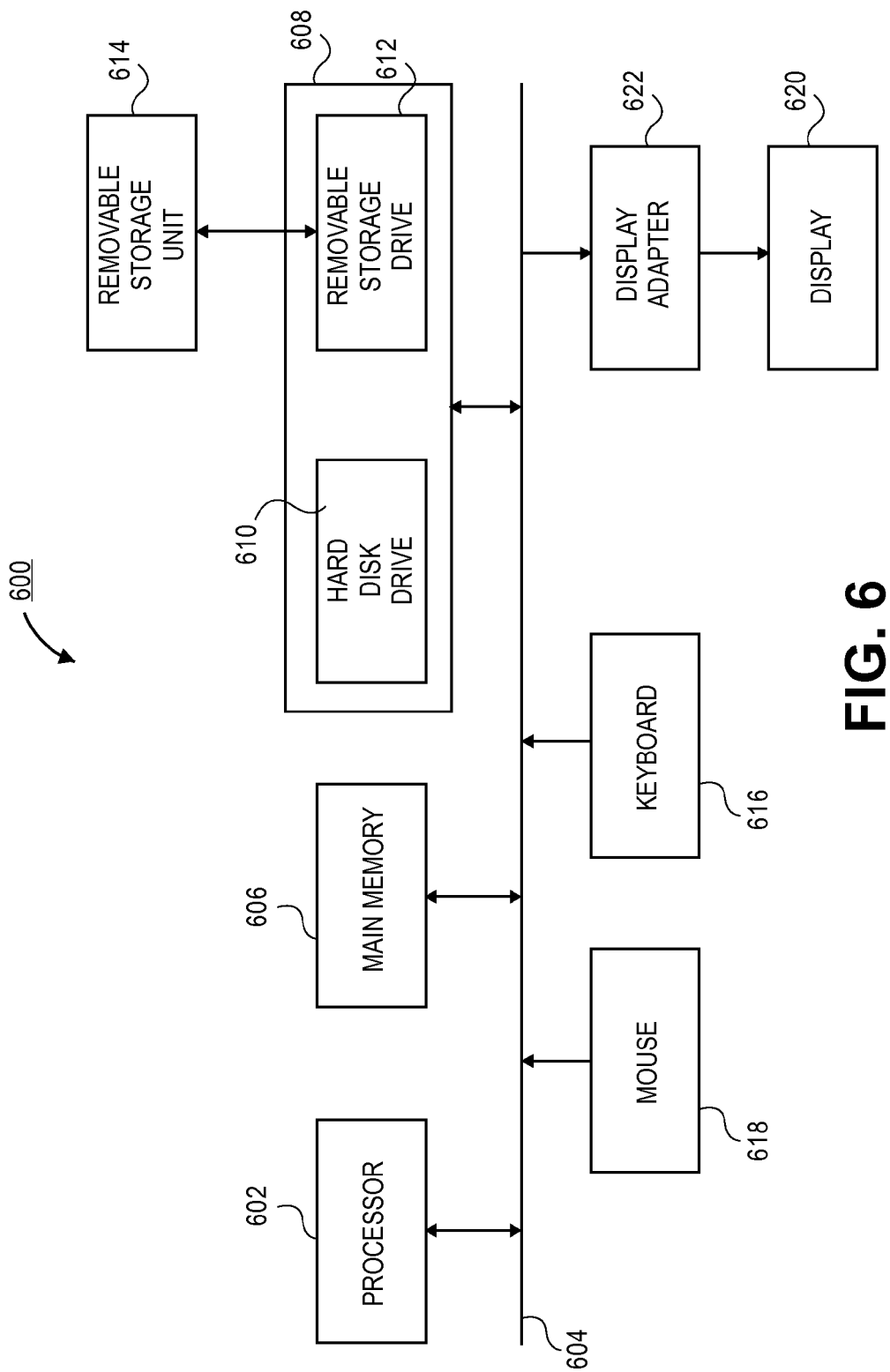
FIG. 6 illustrates an exemplary computing platform for the embodiments shown in FIGS. 3-5.

FIG. 6 illustrates an exemplary block diagram of a computing platform 600 where an embodiment may be practiced. The functions of the embodiments of the present invention of the optimizing run-time linker may be implemented in program code and executed by the computing platform 600. The run-time linker may be implemented in computer languages such as PASCAL, C, C++, JAVA, etc.

As shown in FIG. 6, the computer system 600 includes one or more processors, such as processor 602 that provide an execution platform for embodiments of the optimal run-time linker. Commands and data from the processor 602 are communicated over a communication bus 604. The computer system 600 also includes a main memory 606, such as a Random Access Memory (RAM), where the optimal run-time linker may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the optimal run-time linker may be stored. The removable storage drive 612 reads from and/or writes to a removable storage unit 614 in a well-known manner. A user interfaces with the optimal run-time linker with a keyboard 616, a mouse 618, and a display 620. A display adapter 622 interfaces with the communication bus 604 and the display 620. The display adapter also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of optimization in a run-time execution environment, the method comprising:
   searching, by a run-time linker, through a symbol table associated with an object, wherein the object is linkable to other objects to create a run-time version of a program;
   identifying a special symbol table entry in the symbol table;
   executing a callback function to determine an optimized function for the special symbol table entry; and
   receiving, from the callback function, an address of the optimized function for the special symbol table entry in the symbol table.

2. The method of claim 1, wherein the callback function is configured to determine a characteristic of an execution environment for the program.

3. The method of claim 2, further comprising selecting the optimized function based on the characteristic of the execution environment.

4. The method of claim 1, wherein the special symbol table entry stores an address of the callback function.

5. The method of claim 1, wherein the object is in an Executable and Linking Format.

6. The method of claim 1, wherein the object is in an Extended Common Object File Format.

7. An apparatus comprising:
   a memory containing instructions; and
   a processor configured to execute the instructions to perform the method of claim 1.

8. A non-transitory computer-readable medium comprising instructions for causing a processor to perform the method of claim 1.

9. A method of optimization in a run-time environment, the method comprising:
   determining, by a processor, a characteristic of the run-time environment;
   selecting an optimized function based on the characteristic; and
   returning an address of the optimized function to a linker.

10. The method of claim 9, wherein a request is received in response to a symbol table associated with an object containing an address of a callback function.

11. The method of claim 10, wherein the object is in an Executable and Linking Format.

12. The method of claim 10, wherein the object is in an Extended Common Object File Format.

13. The method of claim 10, wherein the characteristic comprises at least one of a type of the processor, a version of an operating system, and a type of a peripheral.

14. A system for optimizing a run-time environment, the system comprising:
   a memory containing a plurality of objects associated with a software application, wherein each object is associated with a respective symbol table; and
   a processor configured to execute a run-time linker, wherein the run-time linker is configured to link the plurality of objects to create an executable image of the software application, configured to scan for definitions of each symbol table of the plurality of objects, configured to determine a type of entry of each symbol table, and configured to execute an callback function in response to the type of entry being an optimized functional entry.

15. The system of claim 14, wherein the callback function is configured to determine a characteristic of the run-time environment.

16. The system of claim 15, wherein the callback function is configured to select an optimized function based on the characteristic of the run-time environment.

17. The system of claim 16, wherein the callback function is configured to return an address of the optimized function to the run-time linker.

18. The system of claim 14, wherein the plurality of objects are in an Executable and Linking Format.

19. The system of claim 14, wherein the plurality of objects are in an Extended Common Object File Format.

20. The system of claim 14, wherein the plurality of objects includes at least one library.

* * * * *